United States Patent [19]

Butler

[11] 4,150,756
[45] Apr. 24, 1979

[54] BALE WAGON

[75] Inventor: L. Dennis Butler, Kingsburg, Calif.

[73] Assignee: Sperry Rand Corporation, New Holland, Pa.

[21] Appl. No.: 891,890

[22] Filed: Mar. 30, 1978

[51] Int. Cl.² ............... A01D 87/12; B65G 57/32
[52] U.S. Cl. .................................... 414/40; 198/374; 414/757
[58] Field of Search ............ 214/1 Q, 1 QB, 6 B, 214/6 C, 6 P, 518–522; 198/374

[56] References Cited

U.S. PATENT DOCUMENTS

| 3,098,554 | 7/1963 | Zeligowsky | 214/1 Q X |
|---|---|---|---|
| 3,197,043 | 7/1965 | Unger | 214/6 B |
| 3,367,518 | 2/1968 | Bishop | 214/6 B |
| 3,497,085 | 2/1970 | Jay et al. | 214/6 B |
| 3,523,616 | 8/1970 | Neely | 214/6 B |
| 3,687,302 | 8/1972 | Castro | 214/6 B |
| 3,690,473 | 9/1972 | Miguel | 214/6 B |
| 3,923,176 | 12/1975 | Wynn et al. | 214/6 B X |
| 4,020,941 | 5/1977 | Kennedy | 214/1 Q X |

Primary Examiner—L. J. Paperner
Attorney, Agent, or Firm—John B. Mitchell; Frank A. Seemar; Ralph D'Alessandro

[57] ABSTRACT

A bale wagon having an improved bale-receiving means, which is operable to deposit bales onto the bale-supporting means either on edge or on the flat is disclosed. A pusher mechanism including a bale-engaging member moves the bales on edge to the bale-supporting table or operates in conjunction with a bale-turning apparatus to rotate the bales 90 degrees axially prior to the transfer step. Swing arms within the bale-engaging member allow the selective 90 degree pivoting of bales necessary for the automatic formation of tie tiers.

8 Claims, 9 Drawing Figures

BALE WAGON

BACKGROUND OF THE INVENTION

This invention relates generally to bale wagons for forming a stack of crop material bales, and specifically to an improved bale-receiving means for controlling the positional attitude of bales in the finished stack.

It is accepted present day practice to form bales of crop material such as hay or the like into stacks through the employment of an automatic bale wagon. One type of bale wagon which has achieved wide-spread commercial acceptance is the automatic bale wagon which employs the three table concept, as originally illustrated and described in U.S. Pat. No. 2,848,172 which issued to Gordon E. Grey.

The Grey bale wagon includes a first table which successively receives bales from a bale loader or pickup on the wagon and accumulates a predetermined number of them, for example two, being arranged end-to-end in a row, a second table or bale-supporting means which successively receives the accumulated rows of bales from the first table and accumulates a plurality of them, such as four, five or six rows, which plurality of rows is commonly called a tier of bales, and a third table or load bed which successively receives the tiers from the second table and accumulates the plurality of tiers, for example seven, to form a stack thereon. Once the stack has been accumulated on the load bed, it may be unloaded by pivoting the load bed 90 degrees and depositing the stack on the ground with the first tier of bales which was previously accumulated on the second table now being the lowermost tier of the stack in contact with the ground surface.

Since the stack formed by the bale wagon and deposited on the ground at a storage location may remain there for an extended period of time, it is desirable that the bales forming the lowermost tier be oriented such that a non-twine or -wire bearing side of each bale, commonly referred to as an "edge" side of a bale, is in contact with the ground in order to avoid wire rusting or twine rotting which eventually would result in broken bales in the lowermost tier and probable toppling of the stack.

To provide the aforementioned desired orientation of the bales of the lowermost tier of the stack, the operations which have heretofore been performed in picking up and forming bales into each of the tiers of the stack by the bale wagon are as follows. First, bales deposited on one of their edge sides in a field by a baler are picked up by the bale wagon loader and moved through a 90 degree lateral path to the first table where they are supported on one of their twine or wire bearing sides, commonly referred to as a "flat" side of the bale. Then, the first table is pivotally moved so as to lift and revolve the bales approximately 90 degrees and deposit them on the second table of the wagon in the same desired edge orientation as they will appear when subsequently transferred in stack form by the load bed of the wagon to the ground.

In order to enhance the stability of the stack, it is generally desirable to provide one or more tied tiers within the stack, such being tiers having individual bales arranged to overlap two bales in adjacent tiers above and below the tie tier. Formation of one or more tie tiers can be accomplished during formation of the stack on the bale wagon, for example, through utilization of mechanisms similar to those illustrated and described in U.S. Pat. No. 3,395,814 which have been incorporated into several present day commercial models of the Grey bale wagon.

Overall, the stacks of bales formed by many current models of Grey bale wagon, wherein all the bales are oriented on their edge sides, have satisfactory stability. However, with respect to stacks which must conform to certain legal width restrictions in order for transport on public highways by trucks and are formed of bales having certain size dimensions, it has been found more desirable to orient the bales of all the tiers of the stacks, including the tie tiers, but excluding the lowermost tier, on the flat sides. For example, in the case of bales having the approximate size dimensions of 16 inches (edge side width)×23 inches (flat side width)×46 inches (length) being most prevalent in the southwestern region of the United States, bales oriented on their flat (23 inches wide) sides each cover a surface area having a length approximately twice that of its width and thus may be formed by some current Grey bale wagon models and compact, square tie tier patterns utilizing a tie mechanism similar to that disclosed in the aforementioned U.S. Pat. No. 3,395,814, as well as a compact and square standard tier pattern, if such current models were adapted to pick up bales laying on their flat sides in the field. Standard and tie tiers having such a compact and square configuration would form a block-stack which conforms to the legal width and tier pattern restrictions for public highway transportation.

As mentioned, many models of the Grey bale wagon pick up and form a stack of bales which have been deposited on edge on the ground by a baler. While this is the prevailing approach, it does have disadvantages which come to the fore under certain operating conditions. More specifically, under hilly conditions, edge dropped bales have a tendency to roll over onto a flat side and thus hinder efficient stacking by a bale wagon. Though substantially any Grey-type wagon could be modified to pick up bales on the flat, such is not normally done because most models do not have the capacity of selectively depositing bales onto the second table in either one of an edge side or a flat side orientation, and thus could not produce a stack with the bottom tier on edge as described above.

The first table mechanism described in U.S. Pat. No. 3,923,176 allows for the versatility mentioned immediately above. Bales may be transferred from the first table to the second table either on edge or on the flat, depending upon what type of tier is being formed.

The invention to be described below results in the same versatility provided by the apparatus disclosed in the 3,923,176 patent; however, it does so with a more simple and reliable structure.

BRIEF SUMMARY OF THE INVENTION

It is an object of the instant invention to provide an improved bale wagon structure.

It is another object of the instant invention to provide a bale wagon with improved operational efficiency, especially under hillside conditions.

It is another object of the instant invention to provide a bale-receiving means on a bale wagon which allows selective transfer of bales to the bale-supporting area in either edge or flat modes.

It is another object of the instant invention to provide a bale-receiving means for a bale wagon which allows for the formation of tied stacks.

It is another object of the instant invention to provide a bale-receiving means for a bale wagon which is simple of construction, relatively inexpensive of manufacture, and extremely effective in use.

It is a further object of the instant invention to provide a bale-receiving means on a bale wagon which includes a bale-engaging member which may selectively move bales onto a bale-supporting area on edge or, in combination with a bale-turning means, axially pivot the bales 90 degrees prior to transfer.

It is a still further object of the instant invention to provide a bale-receiving means on a bale wagon which includes a pair of swing arms which may selectively engage bales and pivot them 90 degrees laterally to form the rail bales of a tie tiers.

These and other objects are attained according to the instant invention by providing a bale wagon having an improved bale-receiving means which is operable to deposit bales onto the bale-supporting means either on edge or on the flat. A pusher mechanism including a bale-engaging member moves the bales on edge to the bale-supporting means or operates in conjunction with a bale-turning apparatus to rotate the bales 90 degrees axially prior to the transfer. Swing arms within the bale-engaging member allow the selective 90 degree pivoting necessary for the automatic formation of tie tiers.

BRIEF DESCRIPTION OF THE DRAWINGS

For a better understanding of the invention, as well as other objects and further features thereof, reference is made to the following detailed disclosure of the invention taken in conjunction with the accompanying drawings wherein.

DETAILED DESCRIPTION OF THE PREFERRED EMBODIMENT

Figures 1, 2:
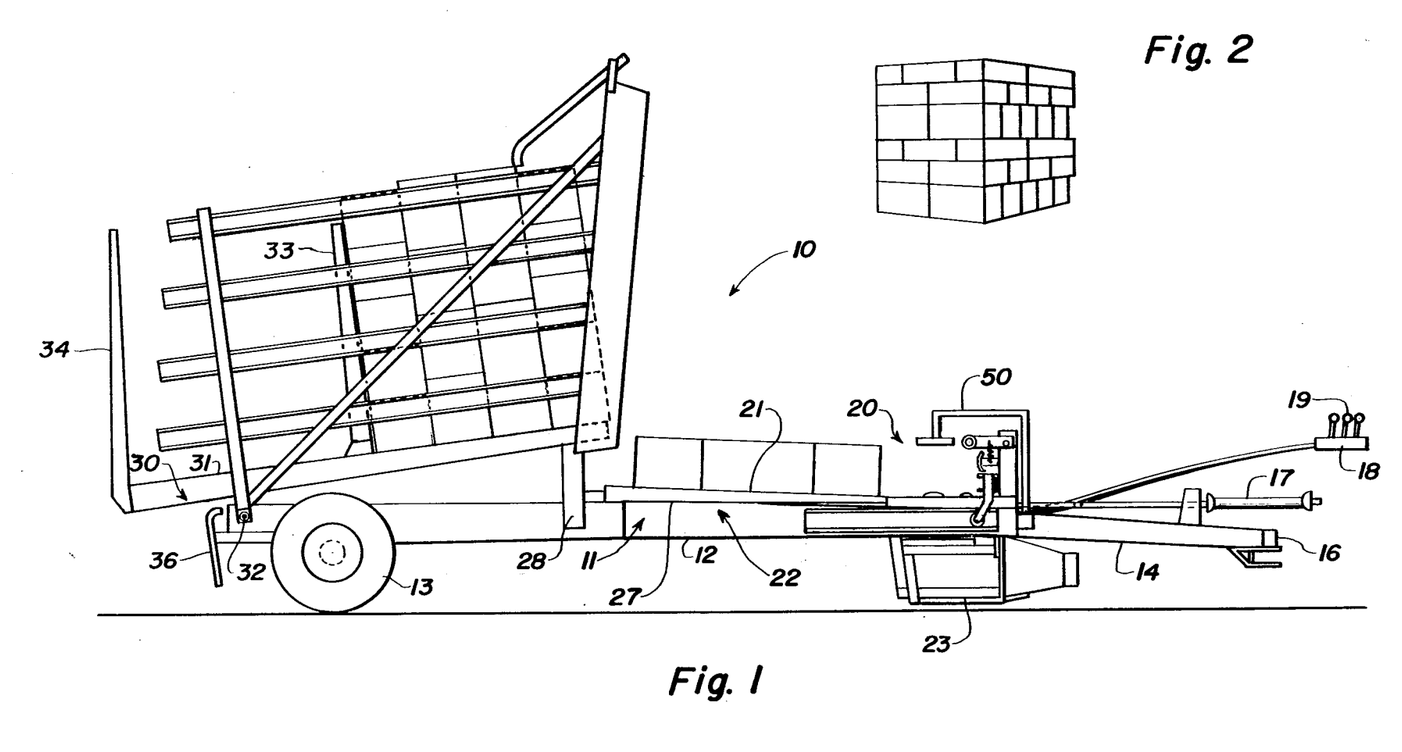
FIG. 1 is a side elevational view of a bale wagon embodying the principles of the present invention, showing the bale wagon with a partially formed block-type stack of bales on its load bed and during formation of a tier of bales on its bale-supporting table.
FIG. 2 is a perspective view of a standing block-type stack on a smaller scale than that of FIG. 1, showing the stack after it has been deposited upright on the ground by the bale wagon of FIG. 1, with the bales of the lowermost and fourth tiers resting on one of their edge sides and the bales of the remaining tiers resting on one of their flat sides.

Referring now to the drawings, and particularly to FIG. 1, there is shown a bale wagon being indicated generally by the reference numeral 10, for forming a block-type, tied or interlocked stack of bales, as shown in FIG. 2, which wagon 10 incorporates the preferred embodiment of the improved receiving means for a bale wagon comprising the present invention.

The bale wagon 10 is provided with a mobile chassis, indicated generally at 11, formed of left and right longitudinal extending channels 12 (only the right channel being shown), suitably interconnected by spaced transverse channels (not shown), and a pair of wheels 13 only the right wheel of said pair being shown in FIG. 1, for movably supporting the interconnected channels 12. On the forward ends of channels 12 there is mounted a converging tongue 14 terminating forwardly in a hitch 16 for the ready attachment of a tractor or like vehicle. A conventional power take-off 17 is adapted to be fixed forwardly to the tractor and rearwardly to the cross conveyor drive and conventional hydraulic pump to operate the various elements of the bale wagon. A control panel 18, with levers 19 thereon, are connected to the system hydraulics and allow ready system supervision by the operator. Although the wagon illustrated is a pull-type, it could readily take the form of a self-propelled type wagon with the forward ends of channels 12 affixed to a cab for housing the operator and various controls for the wagon.

Mounted near the forward end of the mobile chassis 11, immediately rearwardly of tongue 14, and extending transversely thereto is the preferred form of means for receiving bales, generally indicated by the reference numeral 20, comprising the improvement provided by the present invention and hereinafter referred as the improved bale-receiving means of the wagon 10. The bale-receiving means 20 is positioned adjacently along and generally in the same plane as the bale-supporting area, generally designated 21, defined by means hereinafter referred to as the tier-forming table of the wagon 10, generally indicated by the reference numeral 22.

The improved bale-receiving means 20 is selectively operable to deposit bales on the bale-supporting area 21 either on one of the edge or flat sides of the bales. The improved construction of the means 20 and the components for operating it to deposit bales on edge or on flat will be described in greater detail below.

It will be understood by those skilled in the art that the bales are first introduced to the bale-receiving means by a bale loader or pickup, generally indicated at 23, which is mounted to the chassis 11 at the left end of the table 20 and operative to lift bales, resting on one of their flat sides, from the ground and direct them through a generally 90 degree arcuate lateral path to the left receiving end of means 20. The loader 23 is generally similar to the one illustrated and described in U.S. Pat. No. 2,848,127 and will not be illustrated and described in detail herein. It should be appreciated that any suitable pickup may be used.

It will be also be understood by those skilled in the art that a cross conveyor 26 (best seen in FIGS. 3-8) is operatively mounted to the chassis 11 and longitudinally extends along and above a portion of the bale-receiving means from approximately the left receiving end to near the middle thereof for moving the bales laterally from the loader 23 toward the right end of means 20. The cross conveyor 26 is generally similar to the one illustrated and described in the above-mentioned 2,848,127 patent, or more preferably, the one shown in concurrently filed, co-pending U.S. patent application Ser. No. 891,972 entitled "Stack Side Evener" in the name of the same inventor as the instant application and assigned to the same assignee, the entire contents of which is hereby expressly incorporated herein by reference.

The tier-forming table 22 is formed by an L-shaped structure having a forwardly extending leg portion 27 across which is defined the area 21 which provides a surface upon which bales are supported and formed into a tier, and an upperwardly extending rear leg portion (not shown) which is pivotally secured between spaced-apart upstanding brackets 28, only the right one being shown in FIG. 1, mounted on the longitudinal channels 12. A hydraulic cylinder (not shown) is pivotally secured at its anchor end to a frame member mounted between the longitudinal channels of chassis 11. The ram end of the hydraulic cylinder is pivotally secured to the L-shaped structure of the second table 22.

When the table 22 is in its normal substantially horizontal tier-forming position, as shown in FIG. 1, it rests at its forward end on a transverse support member (not shown). When the requisite number of bales have been accumulated and formed on the table 22 in a suitable manner in either a standard tier pattern, an edge tier pattern, or one of several tie tier patterns, the hydraulic cylinder is actuated by suitable trip means (not shown) via suitable hydraulic controls so that it extends and causes the table 22 to swing or pivot upwardly generally 90 degrees about its pivot point to a generally vertical position adjacent the front end of a rearwardly disposed load bed being generally indicated by the reference numeral 30. In this manner, the tier of bales formed on the table 22 is transferred to the load bed 30.

The load-carrying bed 30 includes a platform assembly 31 which is pivotally mounted at 32 to chassis 11. In known manner, either a single or dual hydraulic cylinders are pivotally secured at their anchor ends to transverse frame members on the chassis 11 and at their ram ends to the platform assembly 31. When the load bed 30 is in its normal, generally horizontal tier-receiving position, as shown in FIG. 1, it rests upon upstanding brackets 28. A stack of bales is progressively formed on the load bed 30 upon successive delivery thereto of tiers of bales by pivotal movement of the table 22 from its normal horizontal position of FIG. 1 to its generally upright position adjacent the forward end of the load bed 30.

As the first tier of bales is delivered or deposited onto the load bed 30, a rolling rack 33 for supporting the rear of the load being formed on the load bed 30 is contacted by the tier and forced to move rearwardly along the load bed 30 against the residual holding pressure of a hydraulic cylinder. It will be understood by those skilled in the art that while the rolling rack 33 is held by hydraulic pressure at the position to which it has been moved along the load bed 30, the pressure of the rolling rack cylinder is overcome with the delivery of each successive tier of bales from the table 22 to the front end of the load bed 30 whereby the rolling rack 33 is forced to move rearwardly one bale width until the rack 33 reaches a generally rearmost position along the load bed 30, depending upon the desired number of tiers forming the stack, whereupon a complete stack has been formed on the load bed 30.

When the load bed 30 has been loaded with the desired number of tiers, the stack may be transferred to the ground in the form of a composite stack by extension of the third table hydraulic cylinder(s) which cause the load bed 30 to pivot generally 90 degrees about point 32 from its generally horizontal position of FIG. 1 to an upright position in which the rolling rack 33 and the rear end of the load bed 30, which mounts additional upright support tines 34, are disposed adjacent the ground. The bale wagon is then moved away from the stack while pushoff feet 36 engage the stack and hold it in position for withdrawal of the rolling rack 33 and tines 34. The pushoff feet 36 are operated by hydraulic cylinders (not shown). The stack thus formed may comprise numerous different tier formations and tier sequences. The lowermost tier may be on edge with the remaining tiers on the flat, or edge tiers may be interspersed among flat tiers as shown in FIG. 2. Multiple edge tiers can form small blocks which may be "squeeze" lifted for easy separation and use around the farm.

The operation of the table 22, load bed 30, rolling rack 33, and pushoff feet 36 is well known in the prior art and no further discussion need be made herein to provide an understanding thereof.

Figure 3:
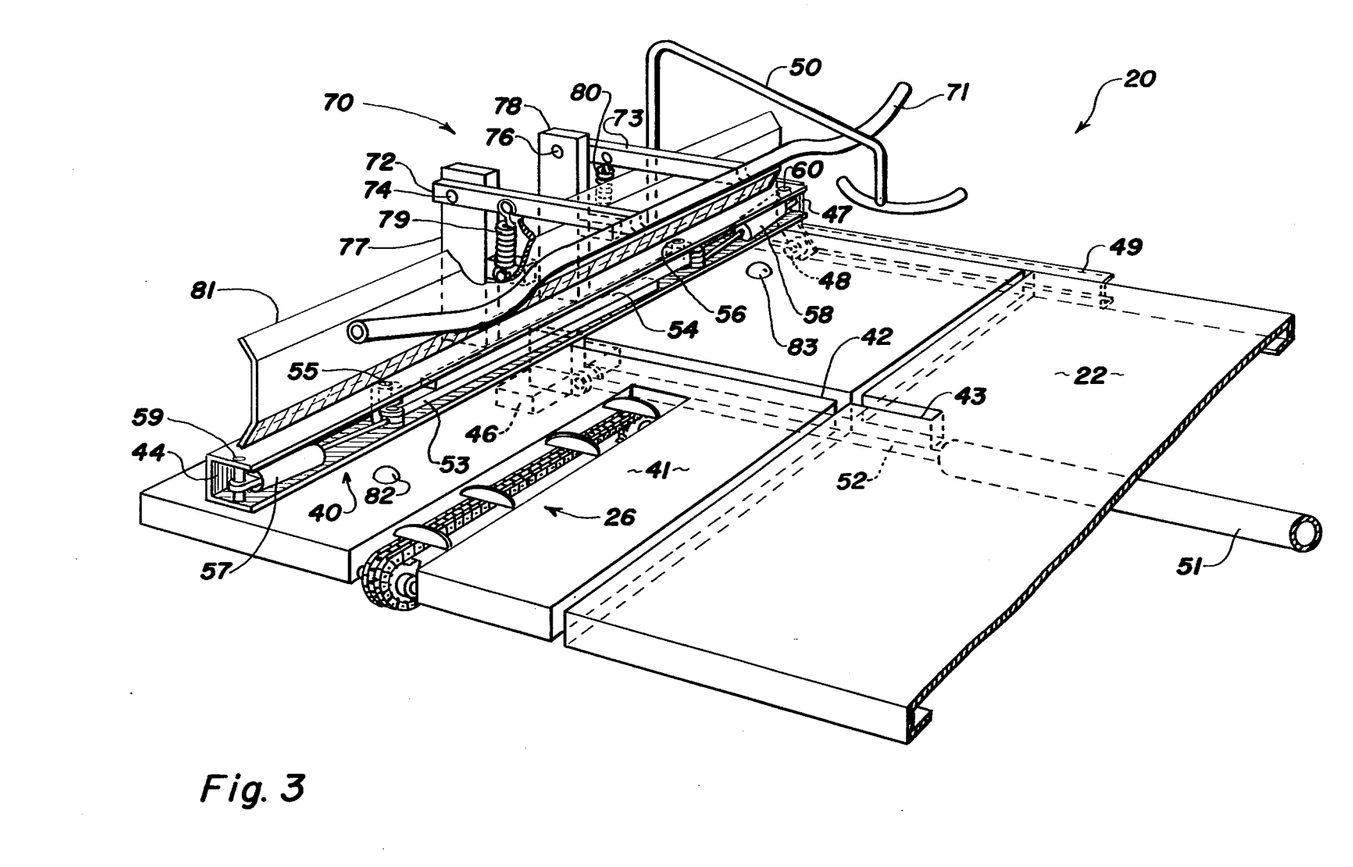
FIG. 3 is an enlarged perspective view of the front portion of the bale wagon of FIG. 1 which portion is located immediately rearwardly of the hitch to which the prime mover may be attached, showing the preferred form of the bale-receiving means, and the front portion of the bale-supporting table.

The preferred form of the improved bale-receiving means 20 is illustrated in detail in FIG. 3, and generally includes a pusher means and a bale-turning mechanism, generally designated by the reference numerals 40 and 70, respectively.

As can be seen, the novel bale-receiving means includes a receiving surface 41 having a central slot 42 extending thereacross. An extension of slot 42 is formed in the forward portion of the table 22, and is designated by the reference numeral 43. Cross conveyor 26 is, as known in the prior art, supported for movement across approximately one half of surface 41 and has flights thereon to engage and move bales toward the right side thereof.

The pusher means 40 includes an elongate bale-engaging member 44 with a generally rotated U-shaped cross section with the open side thereof directed rearwardly toward second table 22. The bale-engaging member 44 is supported for movement slightly above surface 41 by an inverted T-shaped bracket 46 which extends through slot 42. The lateral arms of bracket 46 fit against the underside of surface 41 to give lateral stability to the bale-engaging member 44. A roller and track system (not shown) may be associated with bracket 46 to make movement along slots 42 and 43 more friction free. Briefly referring to FIGS. 4 through 7, an additional support for bale-engaging member 44 can be seen to include an arm 47 affixed to the right end of member 44 and extending downwardly to a terminous with a roller 48 thereon. The roller 48 fits within horizontal track 49 to support that end of member 44 in a fixed relationship with surface 41 throughout its path of movement.

An elongated double-acting hydraulic cylinder 51 is fixed to chassis 11 with the ram 52 thereof fixed to bracket 46. Retraction of ram 52 moves bale-engaging member 44 across surface 41 and onto the forward portion of table 22. Extension of ram 52 causes reverse movement of the member 44. Obviously, the spacing of member 44 above surface 41 is sufficient to allow clearance over cross conveyor 26.

Figure 8:
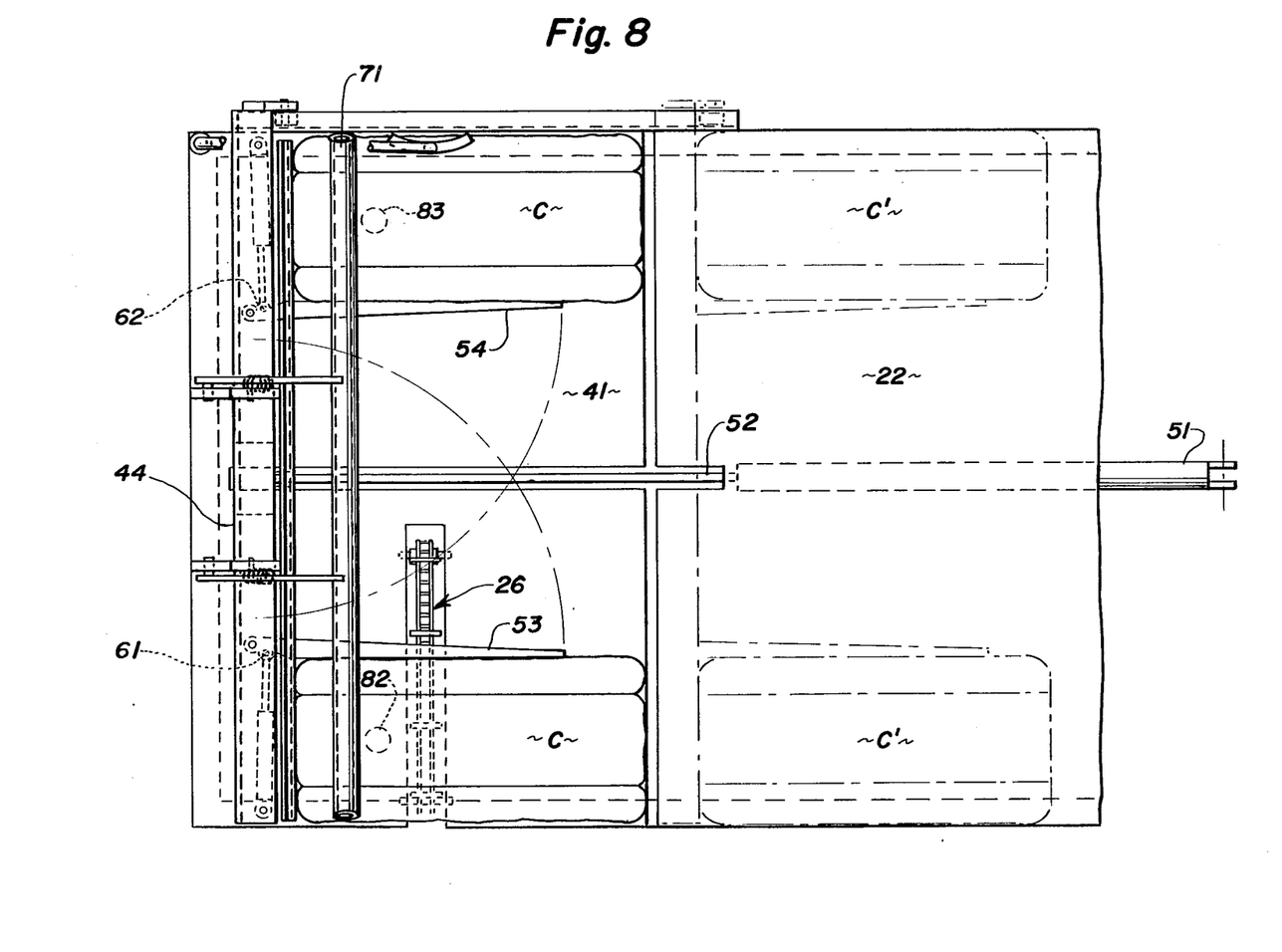
FIG. 8 is a top plan view of the bale-receiving means of FIG. 3 showing in particular the operation of the swing arms for pivoting rail bales into the proper position.

A pair of partially overlapping swing arms 53 and 54 are pivotally fixed within bale-engaging member 44 by pivot pins 55 and 56, respectively. As will be better appreciated shortly, the spacing of pins 55 and 56 from the ends of member 44 are roughly equivalent to the width of a bale of hay. A pair of double-acting hydraulic cylinders 57 and 58 are pivotally fixed within the bale-engaging member by pivot pins 59 and 60, respectively. Each of the swing arms 53 and 54 includes an extension or tab thereon (see 61 and 62 in FIG. 8) to which the ram end of the respective hydraulic cylinders are also pivotably fixed. Thus, retraction of the respective cylinder rams causes the swing arms 53 and 54 to pivot away from each other across the surface 41. A brief view of FIG. 8 shows the swing arms in the extended position after having pivoted bales through a 90 degree arc for positioning as rail bales on the table 22.

The bale-turning means 70 comprises a horizontal pipe-like bale-engaging arm 71 held above the plane of surface 41 by a pair of support arms 72 and 73 pivotally connected, respectively, to upright braces 77 and 78. The upright braces are, in turn, affixed to chasis 11. The support arms 72 and 73, and thus bale-engaging arm 71, are biased downwardly by springs 79 and 80 for reasons to be discussed further below. Bale turning means 70 further includes an elongate substantially vertical bumper 81 which is affixed to upright braces 77 and 78 and positioned forwardly of and slightly below bale-engaging arm 71.

Figure 4:
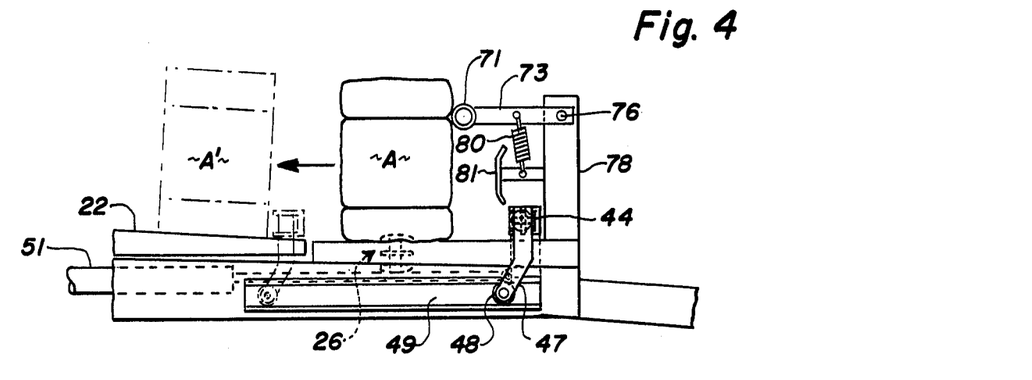
FIG. 4 is a schematic representation of at least one bale being delivered by the bale-receiving means of FIG. 3 on its edge side onto the front portion of the bale-supporting table.

Referring now to FIG. 4, the operation of the bale-receiving means which results in bales being deposited on the table 22 on edge can be seen. The pickup 23 deposits the bale or bales on edge in the position generally designated "A". The bale-engaging member 44 is moved in the direction of the arrow to engage the lower portion of the bale and move it laterally across surface 41 and onto the forward portion of table 22, to the position shown as "A'". It should be noted that in making such transfer, the bale-engaging member 44 completely traverses the bale-receiving means and, due to the slot extension 43 in table 22, actually traverses a small portion of the table 22. This process may, of course, be repeated until the bale-accumulating table is filled with bales on edge.

Figure 5:
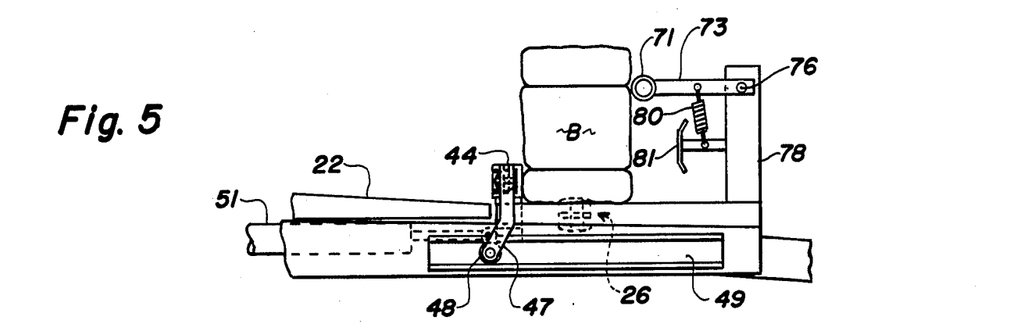
FIGS. 5, 6 and 7 are schematic representations of the bale rotating steps of the bale-receiving means.
Figure 6:
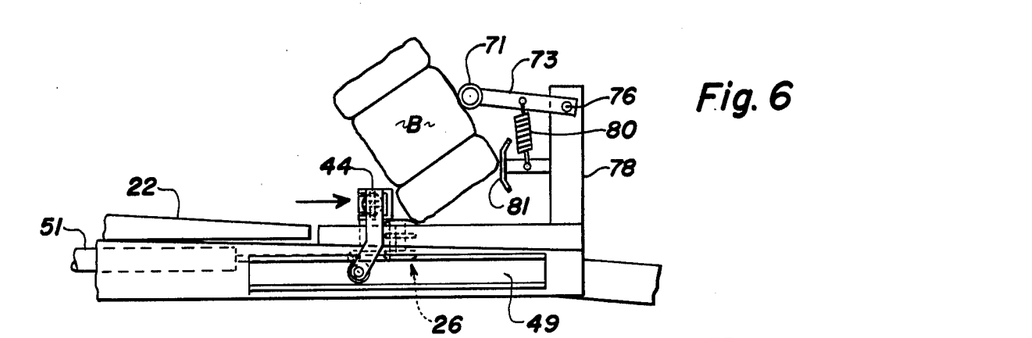
Figure 7:
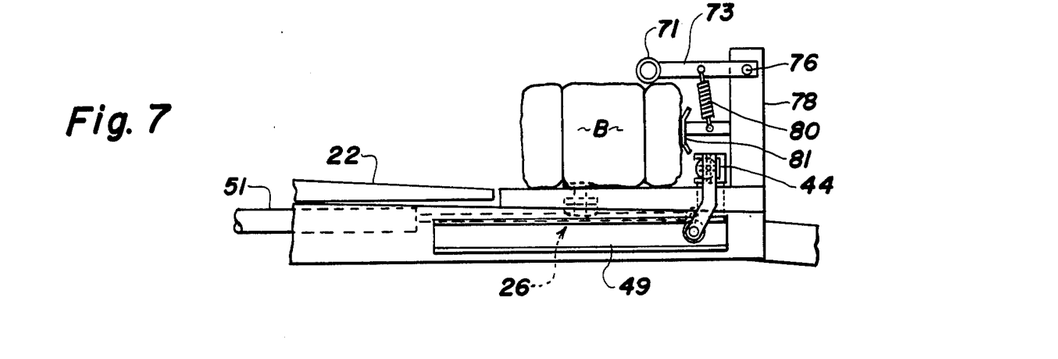

FIGS. 5 through 7 show the operation of the bale-receiving means which results in bales being deposited on the table 22 on a flat side. Initially, the bale-engaging member 44 is positioned on the rear portion of surface 41 or the forward portion of table 22 and the bale or bales "B" are deposited on the surface 41 and moved to the proper position thereon. Then, as shown in FIG. 6, bale-engaging member 44 is moved forwardly to engage the lower portion of the bale "B" while the bale-engaging arm 71 substantially simultaneously engages the upper opposite side portion to tilt the bale rearwardly. After the bale has tilted slightly, the forward bottom corner thereof engages the bumper 81. Arm 71 maintains a fairly constant pressure on the side of the bale due to the pivoting about pints 74 and 76 and the bias of springs 79 and 80. After the bale-engaging member 44 has completed its traversal of surface 41, the bale "B" has been rotated 90 degrees until it rests on a flat side thereof, as shown in FIG. 7. Member 44 may then be cycled as shown in FIG. 4 to move the bale or bales onto the forward portion of table 22.

Bale-engaging arm 71 may be substantially straight; however, it preferably has curved end sections as shown in FIG. 3. The curved portions engage and better hold the bales, when two are simultaneously rotated, in the proper position against bumper 81 on surface 41.

FIG. 8 shows the operation of the bale-receiving means in the formation of rail bales on the table 22 necessary to produce a tie tier. Firstly, two bales are deposited on edge on surface 41, and then the bales are rotated 90 degrees onto a flat side thereof as shown in FIGS. 5 through 7. Next, swing arms 53 and 54 are activated to move the bales through a 90 degree pivot until their longitudinal axes are substantially parallel to the direction of travel of the bale wagon. The bale-engaging arm 71 maintains constant pressure on the bales during this pivot motion and, assisted by the semi-spherical pivot knobs 82 and 83 (seen in FIGS. 3 and 8). The bale-engaging member 44 is then again caused to move across surface 41 and onto the forward portion of table 22 to move the bales from the positions "C" to those shown as "C'". The mix of rail bales and transverse bales necessary to make up the various tie tier patterns is known in the prior art. For example, some standard tie tier patterns are shown in FIGS. 25 and 26 of U.S. Pat. No. 3,927,771.

Figure 9:
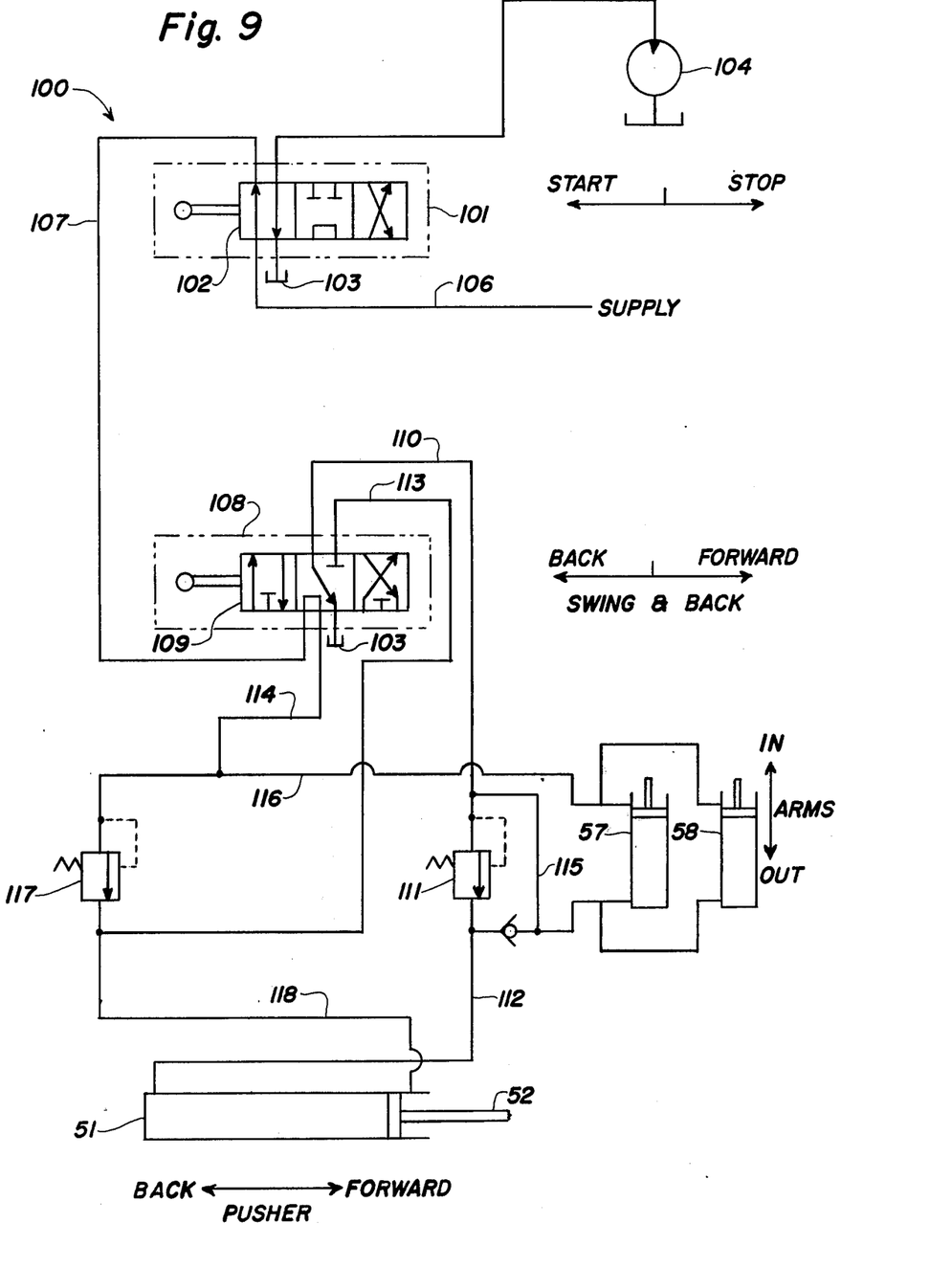
FIG. 9 is a schematic representation of the hydraulic circuit associated with the bale-receiving means of the instant invention.

Referring now to FIG. 9, there is shown a hydraulic means 100 for selectively actuating hydraulic cylinder 52, cross conveyor 26, and swing arm cylinders 57 and 58 to eventually either place bales on table 22 on the flat or on edge and to selectively pivot the bales 90 degrees.

The hydraulic means 100 includes a cross conveyor selector valve 101 having a spool 102 being movable between start and stop positions as shown in the arrow diagram. With the spool in the position shown, the hydraulic motor 104, operating the cross conveyor, is connected directly to the tank 103, and is thus inactive. Line 106 carries hydraulic fluid under pressure from a supply as shown, usually a hydraulic pump (not shown). When the spool 102 is moved to the leftmost position, line 106 directs fluid to the motor 104 to activate the cross conveyor, and line 107 is connected to tank 103. The embodiment shown in this figure employs a hydraulically operated cross conveyor; however, a directly driven cross conveyor with a clutch could also be employed. Also, the pickup could be operated by motor 104, or separately driven by direct drive or a separate hydraulic means.

Pusher means selector valve 108 includes a three-position spool 109 which regulates the direction of travel of the bale-engaging member 44 and the activation of swing arms 53 and 54. The positional responses of the spool 109 are as shown in the arrow diagram. When the spool 109 is in its rightmost position, and when conveyor selective valve spool 102 is in the stop position, pressurized fluid flows through line 107, through the spool along line 110 to pressure relief valve 111. Valve 111 causes a build-up of pressure in line 115 which insures that the rams of swing cylinders 57 and 58 are extended, and thus that the swing arms 53 and 54 are in their retracted positions. The pressure then builds up until the fluid passes through valve 111 and line 112 into cylinder 51 which results in the extension of ram 52. As stated above, the extension of ram 52 results in the movement of bale-engaging member 44 to its forward-most position. Also, with the spool 109 in its rightmost position, line 113 is connected directly to tank 103.

When spool 109 is in the middle position, as shown in FIG. 9, line 110 is connected to tank 103 and pressurized line 107 is connected to line 114 which pressurizes line 116 in both directions. With line 116 pressurized, relief valve 117 causes parallel cylinders 57 and 58 to retract, or move into the "out" position. This results in the pivoting of swing arms 53 and 54 as described above. When cylinders 57 and 58 have become fully pressurized, the holding force of relief valve 117 will be overcome and the pressure in line 118 will cause double acting cylinder 51 to retract ram 52. This, of course, results in the movement of bale-engaging member 44 rearwardly onto the forward portion of second table 22.

When spool 109 is moved to its leftmost position, pressurized line 107 directs fluid through line 113 and into line 118 which results in ram 52 of cylinder 51 retracting bale-engaging member 44 to its rearmost position. At the same time, line 110 is directed to tank 103.

Thus, it can be seen that the valve means 100 may be manually activated by an operator through manipulation of controls 19 to perform the various functions described above necessary to form tie tiers and normal tiers on the tier-forming table of the bale wagon.

The control system described immediately above can very easily and effectively by manipulated by an operator to produce the desired stacks. One of skill in the art will realize that an electrical control system could also be employed, or that the hydraulic system shown could be further automated. For example, the trip arm 50, shown in FIG. 3, could very readily be connected to spool 102 to control the flow of fluid to the cross conveyor 26 and/or the pickup 23 and/or to spool 109 to control at least the forward and back movement of member 44. Trip arm 50 could very well take the form shown in concurrently filed copending application Ser. No. 891,870 entitled "Two-Position Trip Arm" filed in the name of D. Wells and L. D. Butler and assigned to the same assignee as the instant application. The Wells and Butler application in its entirety is hereby expressly incorporated herein by reference.

It will be understood that various other changes of the details, materials, steps and arrangements of parts and uses which have herein been described and illustrated in order to explain the nature of the invention will occur to and may be made by those skilled in the art upon a reading of this disclosure, and such changes are intended to be included within the principles and scope of this invention.

For example, one of skill in the art will readily realize that the system shown could be modified to pick up bales on edge in the field and deposit them flat on the bale-receiving means. Slight positional modification of the elements 71 and 81 would be required; however, such a modified system could easily turn bales from a flat side to an edge side as required.

Also, the skilled mechanic will appreciate that the addition of rails along side the bale-receiving means and the tier-forming table might prove advantageous. Such rails are disclosed in copending application Ser. No. 891,880, entitled "Apparatus for Retaining Bales in Position on a Bale Wagon" in the name of the same inventor and assigned to the same assignee as the instant application, where application is expressly incorporated herein by reference.

Having thus described the invention, what is claimed is:

1. In a bale wagon having a mobile chassis and means mounted on said chassis defining a bale-supporting area, the improvement comprising:
   bale-receiving means on said chassis including a fixed table generally in the same horizontal plane as said bale-supporting area and adapted to receive at least one bale on a first one of its sides, said fixed table having a length and a width extending between a first edge adjacent said bale-supporting area and an opposing second edge;
   a pusher means including a bale-engaging member extending substantially the length of said fixed table and mounted for selective movement in a first direction from said second edge of said fixed table toward said bale-supporting area and a second opposite direction to engage the lowermost portion of any bale on said fixed table;
   bale-turning means on said chassis for substantial simultaneous interaction upon a bale with said pusher means when moving in said second direction, said bale-turning means including a vertically pivotable substantially horizontal arm member above said fixed table positioned to engage the uppermost portion of any bale, on the side opposite said side bale-engaging member, on said fixed table during the movement of said pusher means in said second direction; and
   control means for selective determination of the movement of said bale-engaging member.

2. The bale wagon of claim 1 wherein said bale-turning means further includes a elongate vertical bumper fixed to said chassis extending substantially the length of said fixed table below said arm member.

3. The bale wagon of claim 2 wherein said arm member is biased downwardly toward said bumper.

4. The bale wagon of claim 3 wherein said bale-engaging member is supported for movement in said first and second directions in a horizontal plane spaced above said fixed table.

5. The bale wagon of claim 3 wherein said pusher means further includes support means affixed to the central portion and a first end of said bale-engaging member guiding same during movement in said first and second directions above said fixed table.

6. The bale wagon of claim 5 wherein said bale-receiving means further includes a cross conveyor extending from a second end of said fixed table, opposite said first end, toward said first end thereof.

7. The bale wagon of claim 6 or claim 1 wherein said bale-engaging member has a U-shaped cross section with opening directed toward said bale-supporting area, and said pusher means further comprises:
   a pair of partially vertically overlapping pivot arms within said bale-engaging member and horizontally pivotally connected thereto at spaced apart locations on said bale-engaging member for arcuate movement through the open side thereof; and
   power means affixed to each of said pivot arms to cause said arcuate movement, whereby bales on said first table may be horizontally pivoted into a rail bale position.

8. The bale wagon of claim 7 wherein said power means comprises separate hydraulic cylinders.

* * * * *